United States Patent
Ruiz-Vela et al.

(10) Patent No.: US 12,433,717 B2
(45) Date of Patent: Oct. 7, 2025

(54) TOOL FOR USE WITH ORTHODONTIC BRACKETS

(71) Applicant: World Class Technology Corporation, McMinnville, OR (US)

(72) Inventors: Alberto Ruiz-Vela, Rancho Cucamonga, CA (US); Juergen Bathen, McMinnville, OR (US)

(73) Assignee: WORLD CLASS TECHNOLOGY CORPORATION, McMinnville, OR (US)

( * ) Notice: Subject to any disclaimer, the term of this patent is extended or adjusted under 35 U.S.C. 154(b) by 571 days.

(21) Appl. No.: 17/369,569

(22) Filed: Jul. 7, 2021

(65) Prior Publication Data
US 2023/0008397 A1  Jan. 12, 2023

(51) Int. Cl.
*A61C 7/02*  (2006.01)

(52) U.S. Cl.
CPC .................................. *A61C 7/026* (2013.01)

(58) Field of Classification Search
CPC ....... A61C 7/026; A61C 7/00287; A61C 3/14; A61C 3/16; A61B 17/128; A61B 17/1285; G04D 1/021; B25B 7/00; B25B 7/02
USPC ....... 968/666; 294/99.2; 81/300, 424.5, 426, 81/426.5
See application file for complete search history.

(56) References Cited

U.S. PATENT DOCUMENTS

| | | | | |
|---|---|---|---|---|
| 54,820 A | * | 5/1866 | Page | B25B 7/10 81/426 |
| 79,724 A | * | 7/1868 | Brown | B25B 7/10 81/426 |
| 168,012 A | * | 9/1875 | Gaillard | A61C 3/14 433/146 |
| 232,428 A | * | 9/1880 | Whiting | F16G 3/00 81/426 |
| 403,105 A | * | 5/1889 | Haussmann | A61C 3/14 30/186 |
| 429,676 A | * | 6/1890 | Cann | B25B 7/12 81/426 |
| 580,429 A | * | 4/1897 | Snyder | B25B 7/10 81/422 |
| 641,019 A | * | 1/1900 | Kiefer et al. | B25B 7/02 29/268 |
| 665,920 A | * | 1/1901 | Loeser | B25B 7/02 7/129 |

(Continued)

FOREIGN PATENT DOCUMENTS

DE  102004043741 A1 * 5/2005 ............... A61C 3/14
KR  20110008515     *  9/2011
KR  20110008515 U  *  9/2011

*Primary Examiner* — Heidi M Eide
*Assistant Examiner* — Holly T. To
(74) *Attorney, Agent, or Firm* — Stoel Rives LLP

(57) ABSTRACT

An instrument for facilitating opening of a ligating member for an orthodontic bracket. The instrument includes one tip designed to engage an opening feature on a labial side of a ligating door of the orthodontic bracket, and another tip designed to sit underneath a tie wing formed on a body of the orthodontic bracket. When the instrument is in position against the orthodontic bracket, squeezing together the handles results in the tips applying a reciprocal force on the ligating door and the bracket body to open the ligating door along the occlusal direction.

20 Claims, 7 Drawing Sheets

(56) References Cited

U.S. PATENT DOCUMENTS

| | | | | |
|---|---|---|---|---|
| 713,808 A * | 11/1902 | Shallenberger | B25B 7/02 | 7/152 |
| 738,444 A * | 9/1903 | Hjorth | B25B 7/02 | 81/426 |
| 776,828 A * | 12/1904 | Earnhart | B25B 7/00 | 30/233 |
| 833,375 A * | 10/1906 | Dollar | A61C 3/14 | 433/145 |
| 942,356 A * | 12/1909 | Shelley | B21L 1/02 | 30/186 |
| 967,463 A * | 8/1910 | Thurston | B25B 7/02 | 81/426 |
| 1,079,997 A * | 12/1913 | Wernimont | A47J 43/283 | 81/416 |
| 1,090,010 A * | 3/1914 | Armstrong | A61B 17/44 | 452/54 |
| 1,094,576 A * | 4/1914 | Kennedy | B25B 7/02 | 81/426 |
| 1,411,823 A * | 4/1922 | Weller | B25B 7/02 | 73/866 |
| 1,434,557 A * | 11/1922 | Mennie | B25B 27/08 | 29/248 |
| 1,585,903 A * | 5/1926 | McIntyre | B25B 7/02 | 7/129 |
| 1,610,622 A * | 12/1926 | Shaweker | A61M 1/63 | 604/7 |
| 1,631,916 A * | 6/1927 | Chambers | B25B 7/10 | 81/424 |
| 1,732,676 A * | 10/1929 | Erbele | B25B 7/02 | 86/21 |
| 1,782,364 A * | 11/1930 | Nation | B25B 7/02 | 81/426 |
| 1,792,837 A * | 2/1931 | Harrison | B25B 7/02 | 43/53.5 |
| 2,212,801 A * | 8/1940 | Torbert | B25B 7/02 | 81/426 |
| 2,248,166 A * | 7/1941 | Eilers | B67B 7/14 | 29/268 |
| 2,625,067 A * | 1/1953 | Stone | B25B 7/02 | 72/409.13 |
| 2,629,114 A * | 2/1953 | Peterson | B25C 11/02 | 7/102 |
| 2,703,502 A * | 3/1955 | Adair | B25B 13/505 | 81/426 |
| 2,967,303 A * | 1/1961 | Wise | B25C 13/00 | 29/283 |
| 2,985,962 A * | 5/1961 | Shiner | A61C 7/04 | 81/418 |
| 2,989,099 A * | 6/1961 | Damm | B25B 7/02 | D8/52 |
| 3,144,793 A * | 8/1964 | Smith | B29C 73/166 | 81/418 |
| 3,218,696 A * | 11/1965 | Dritz | A44B 19/00 | 29/770 |
| 3,395,709 A * | 8/1968 | Rubin | A61B 17/282 | 606/85 |
| 3,456,349 A * | 7/1969 | Werner | A61C 3/14 | D8/52 |
| 3,755,902 A * | 9/1973 | Northcutt | A61C 3/16 | 156/763 |
| 3,986,265 A * | 10/1976 | Cusato | A61C 7/04 | 156/763 |
| 4,014,226 A * | 3/1977 | Karamarkovich | B21D 19/08 | D8/52 |
| 4,021,922 A * | 5/1977 | Goldberg | A61C 7/04 | 433/4 |
| 4,149,435 A * | 4/1979 | Smith | B26F 1/36 | 81/426 |
| 4,248,587 A * | 2/1981 | Kurz | A61C 7/04 | 81/424 |
| 4,327,607 A * | 5/1982 | Morris | B67B 7/14 | 7/165 |
| 4,372,182 A * | 2/1983 | Kolter | B25B 7/02 | 29/268 |
| 4,425,826 A * | 1/1984 | Morris | B67B 7/14 | 81/3.36 |
| 4,457,306 A * | 7/1984 | Borzone | A61F 2/4637 | 81/421 |
| 4,514,171 A * | 4/1985 | Kurz | A61C 7/04 | 433/4 |
| 4,569,071 A * | 2/1986 | Levin | G03B 42/042 | 378/205 |
| 4,600,381 A * | 7/1986 | Hodgson | A61C 7/04 | 433/4 |
| 4,841,821 A * | 6/1989 | Cooper | B25B 7/02 | 29/247 |
| 5,320,637 A * | 6/1994 | Borders, Jr. | A61B 17/02 | 606/205 |
| 5,456,144 A * | 10/1995 | Dahl | B25B 7/123 | 29/268 |
| 5,769,857 A * | 6/1998 | Reztzov | A61B 17/1285 | 606/151 |
| 5,833,460 A * | 11/1998 | Maeda | A61C 3/16 | 433/159 |
| 5,839,141 A * | 11/1998 | Hermann | B21F 15/04 | 7/106 |
| 5,922,008 A * | 7/1999 | Gimpelson | A61B 17/282 | 81/418 |
| 6,136,004 A * | 10/2000 | Keller | A61B 17/921 | 606/104 |
| 6,280,184 B1 * | 8/2001 | Hamilton | A61C 7/04 | 433/4 |
| 6,368,105 B1 * | 4/2002 | Voudouris | A61C 7/30 | 433/11 |
| 6,382,965 B1 * | 5/2002 | Ruiz-Vela | A61C 7/02 | 433/4 |
| 6,663,654 B1 * | 12/2003 | Husain | A61B 17/50 | 606/205 |
| 7,143,671 B1 * | 12/2006 | Lai | B25B 15/00 | 81/368 |
| 7,194,937 B1 * | 3/2007 | Melkowits | B25B 7/02 | 81/426 |
| 7,581,949 B2 * | 9/2009 | Farzin-Nia | A61C 7/02 | 140/121 |
| 8,146,462 B2 * | 4/2012 | Galloway | B25B 7/10 | 81/416 |
| 8,234,764 B1 * | 8/2012 | Wracker | B25B 7/22 | 29/268 |
| 8,650,688 B1 * | 2/2014 | Gasparrini | A44C 27/00 | 7/128 |
| 9,539,705 B2 * | 1/2017 | Arai | B25B 7/02 | |
| 9,872,742 B1 * | 1/2018 | Albarakati | A61C 7/02 | |
| D1,001,277 S * | 10/2023 | Gosik-Wolfe | D24/133 | |
| 12,102,500 B1 * | 10/2024 | Madan | A61C 7/02 | |
| 12,288,956 B1 * | 4/2025 | Woods | B25B 7/02 | |
| 2002/0006595 A1 * | 1/2002 | Voudouris | A61C 7/02 | 433/4 |
| 2003/0134252 A1 * | 7/2003 | Sussman | A61C 1/084 | 433/75 |
| 2004/0072117 A1 * | 4/2004 | Farzin-Nia | A61C 7/20 | 433/10 |
| 2004/0122461 A1 * | 6/2004 | McGuire | A61B 17/1608 | 606/184 |
| 2004/0129117 A1 * | 7/2004 | Hirse | B25B 7/10 | 81/426 |
| 2005/0170314 A1 * | 8/2005 | Golden | A61C 3/14 | 433/159 |
| 2006/0127835 A1 * | 6/2006 | Soo | A61C 7/02 | 433/4 |
| 2006/0161182 A1 * | 7/2006 | Vandenbroek | A61B 17/128 | 606/142 |
| 2006/0183076 A1 * | 8/2006 | Nikolov | A61C 3/14 | 433/159 |
| 2007/0022592 A1 * | 2/2007 | Zhou | B25B 7/00 | 29/239 |
| 2008/0178707 A1 * | 7/2008 | Stevens | H02G 1/1209 | 81/9.43 |

(56) References Cited

U.S. PATENT DOCUMENTS

| | | | |
|---|---|---|---|
| 2009/0004617 A1* | 1/2009 | Oda | A61C 7/287 433/141 |
| 2010/0240008 A1* | 9/2010 | Golden | A61C 3/14 433/159 |
| 2010/0288285 A1* | 11/2010 | Marmar | A61B 17/282 128/843 |
| 2012/0101518 A1* | 4/2012 | DePond | A61B 17/282 606/205 |
| 2013/0230817 A1* | 9/2013 | Kabbani | A61C 7/14 433/3 |
| 2013/0341941 A1* | 12/2013 | Stayton | B25B 9/02 294/99.2 |
| 2015/0374425 A1* | 12/2015 | Hashmi | A61B 17/282 606/105 |
| 2016/0235425 A1* | 8/2016 | Ohki | A61B 17/3201 |
| 2017/0156752 A1* | 6/2017 | Miller | A61B 17/3403 |
| 2018/0271535 A1* | 9/2018 | Shellenberger | A61B 17/1285 |
| 2020/0078032 A1* | 3/2020 | Nanda | A61B 17/30 |
| 2020/0330188 A1* | 10/2020 | Wyllie, II | C04B 35/4885 |
| 2021/0169613 A1* | 6/2021 | Gulesserian | A61C 7/026 |
| 2022/0218437 A1* | 7/2022 | Frazee | A61C 3/14 |
| 2023/0008397 A1* | 1/2023 | Ruiz-Vela | A61C 7/04 |
| 2023/0277277 A1* | 9/2023 | Zamanian | A61C 3/14 433/159 |

* cited by examiner

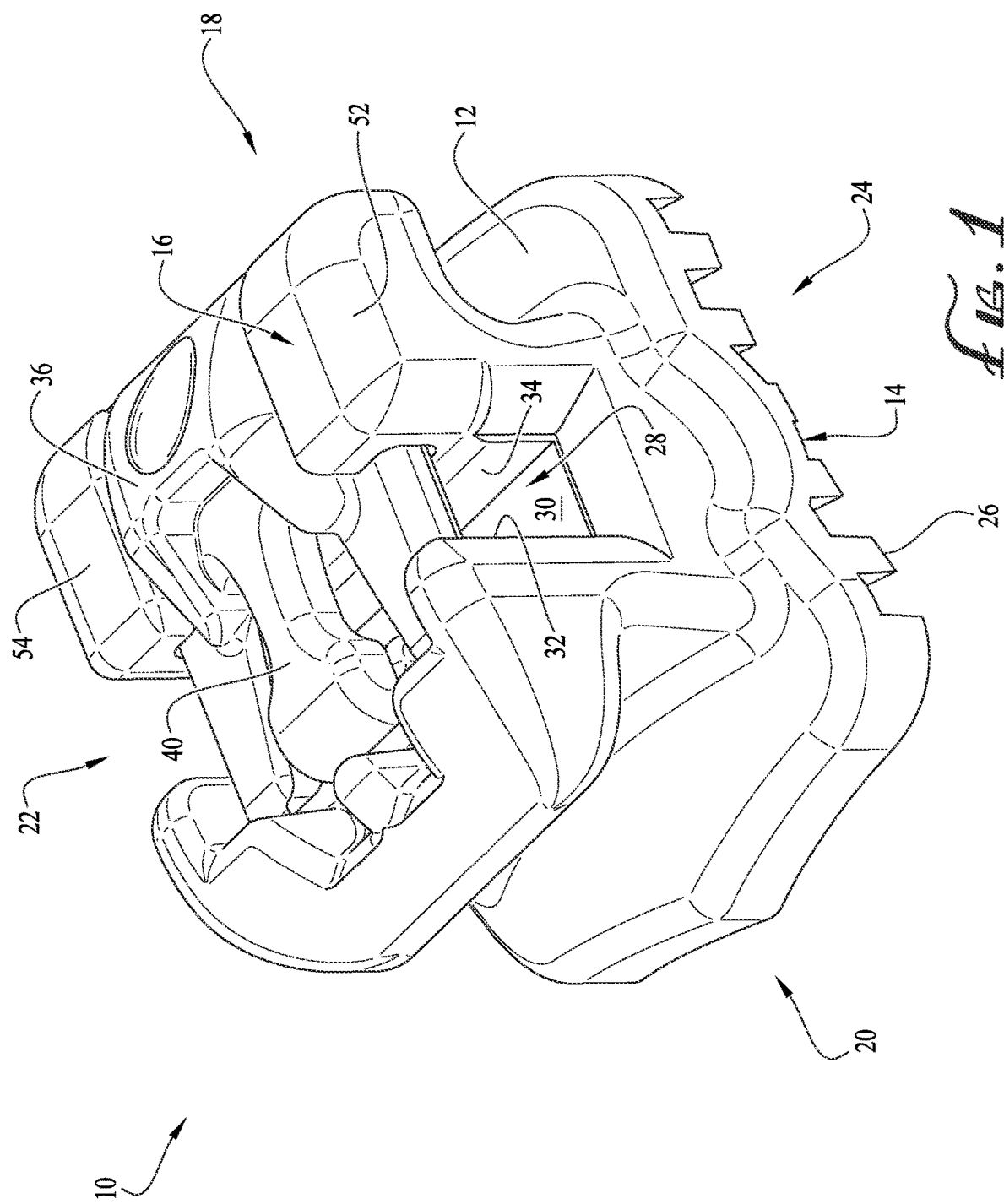

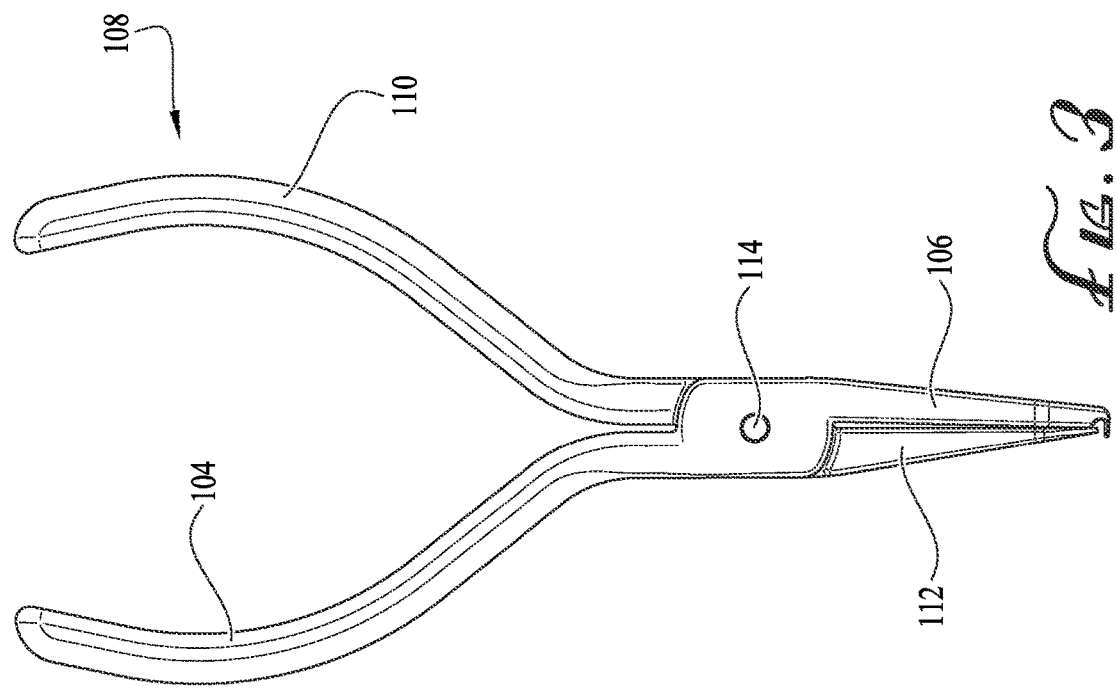
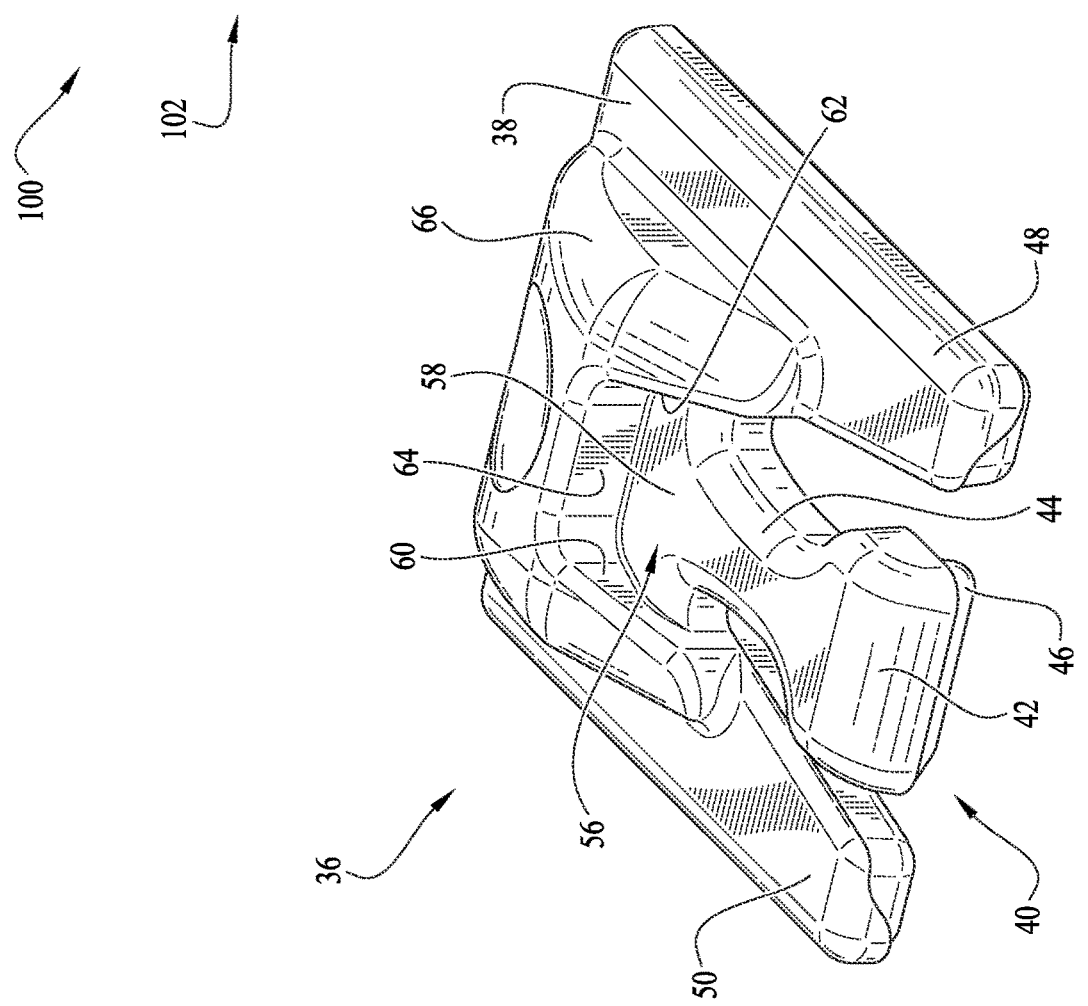

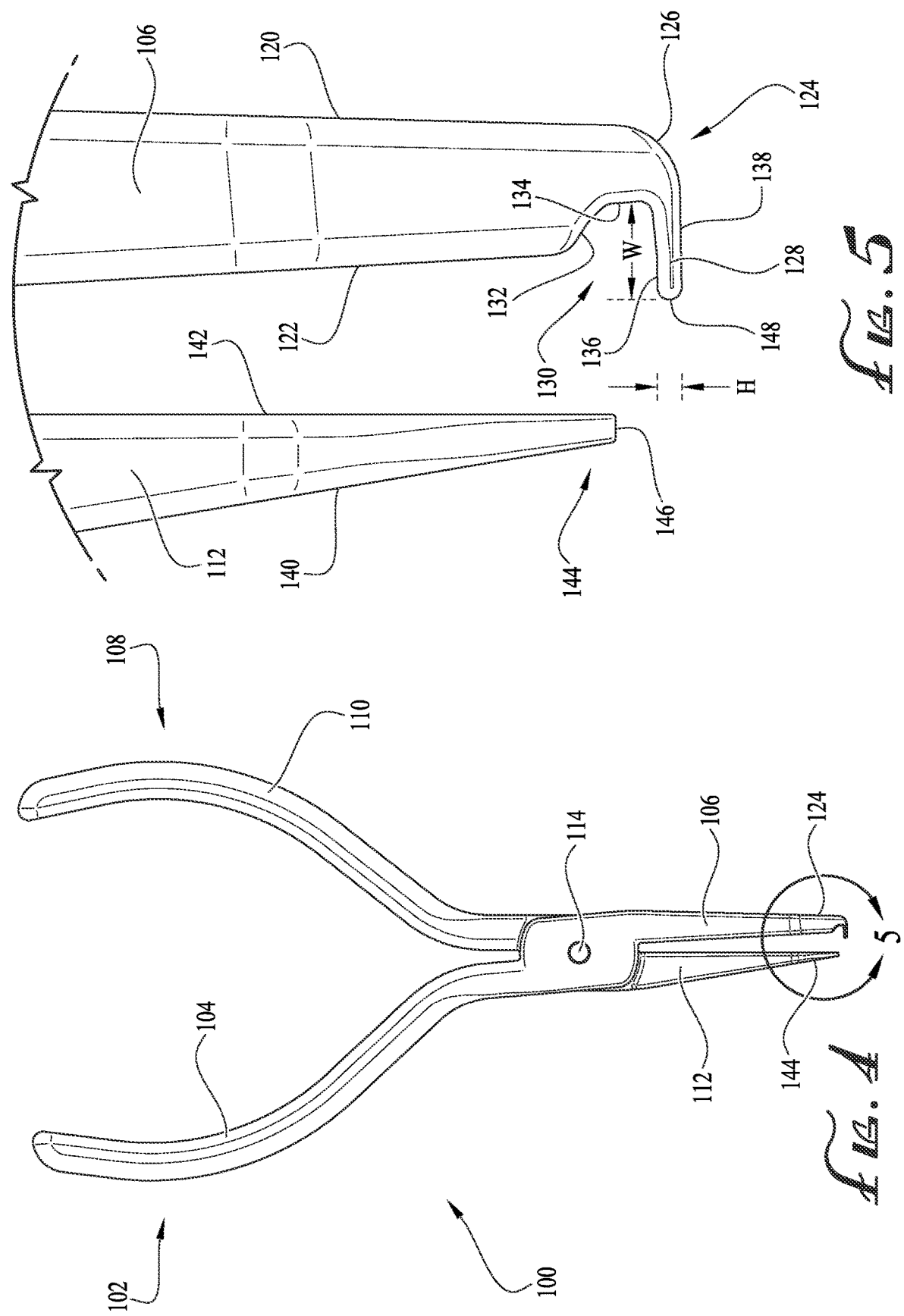

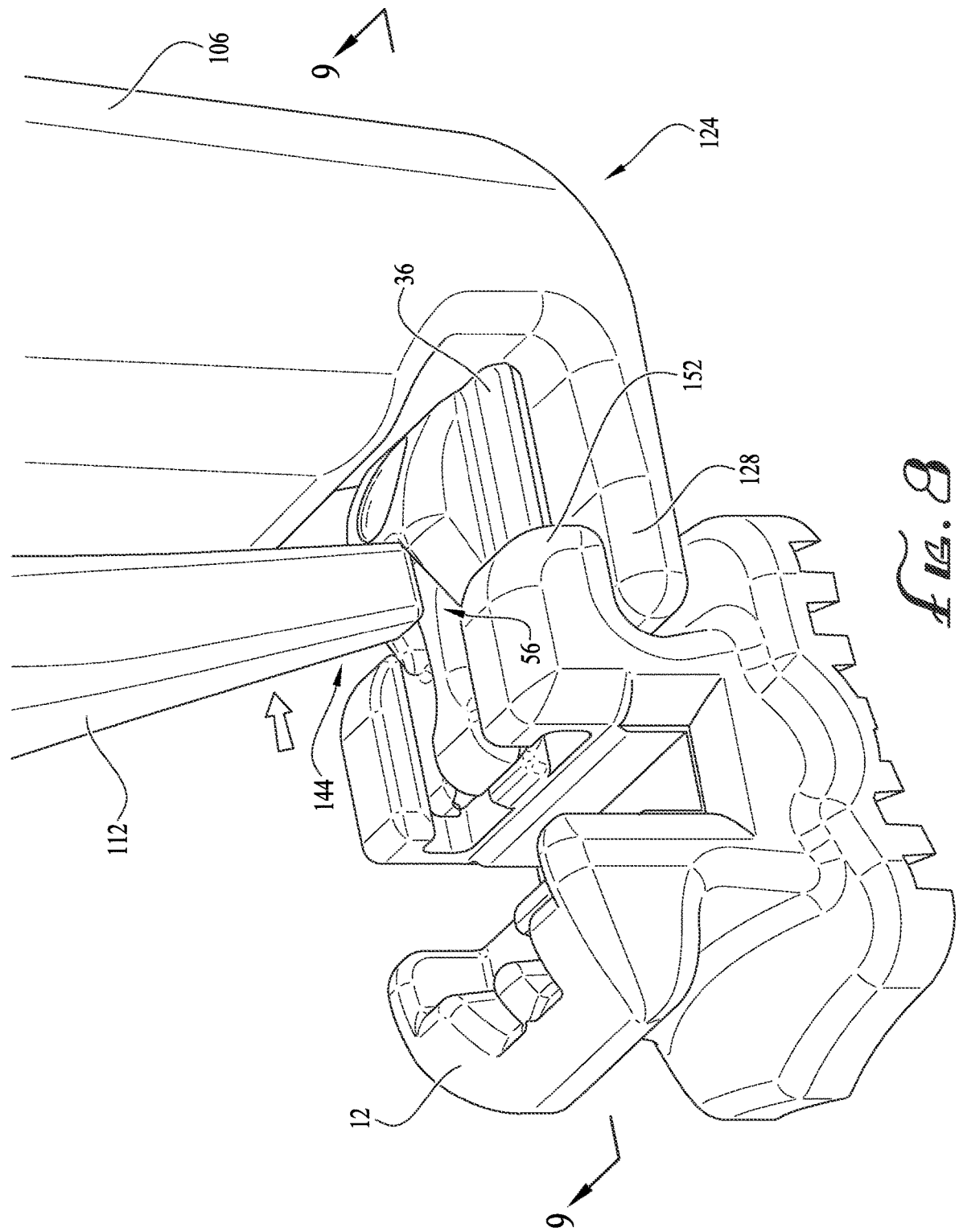

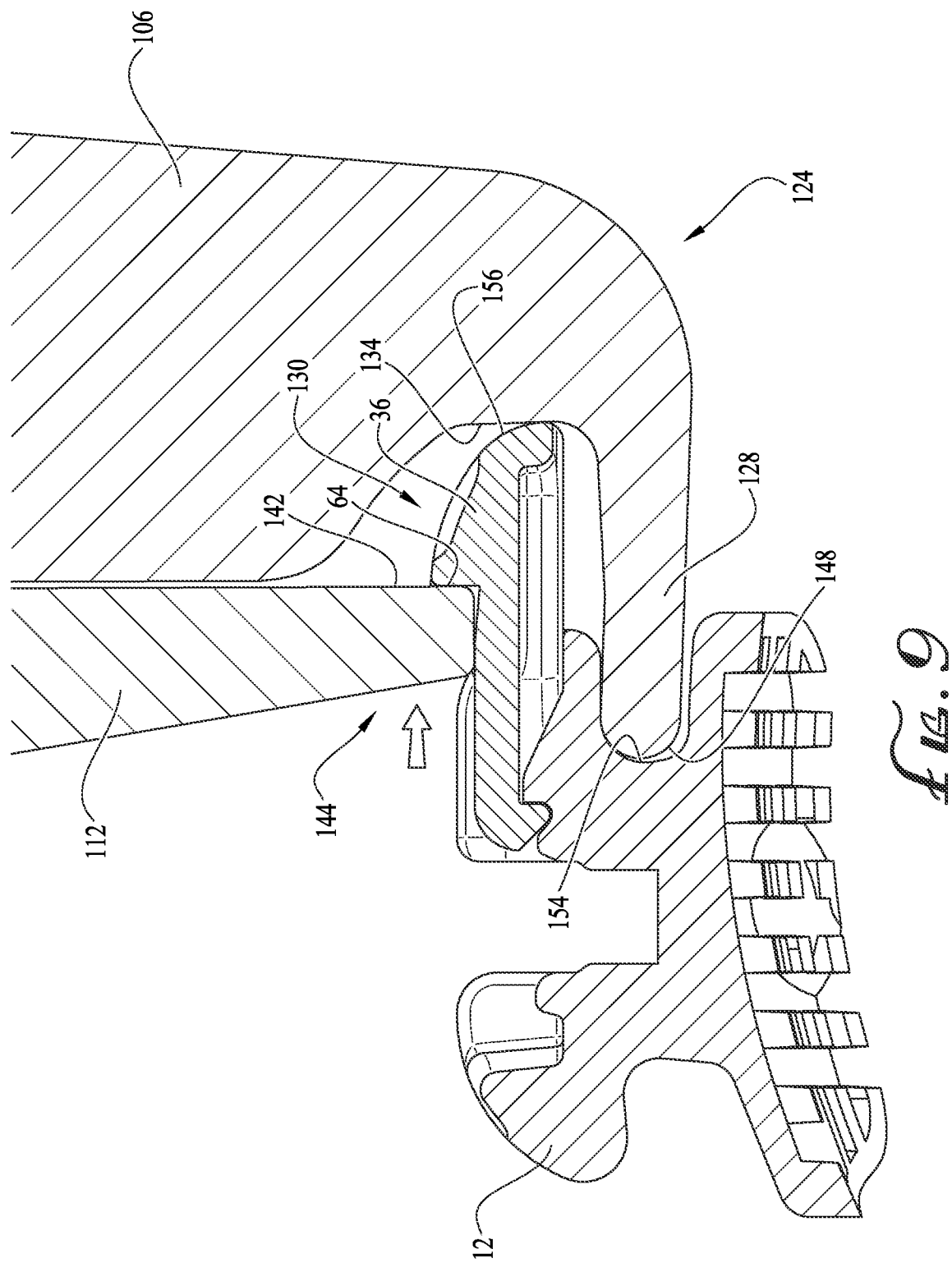

TOOL FOR USE WITH ORTHODONTIC BRACKETS

BACKGROUND

The disclosure relates generally to an orthodontic tool for self-ligating orthodontic brackets, and more specifically, to such tools for facilitating the opening of a ligating slide of the orthodontic bracket for orthodontic treatment.

Orthodontic treatment typically involves orthodontic brackets designed to apply mechanical forces to a patient's teeth to urge improperly positioned teeth into a correct alignment. One form of orthodontic treatment includes the use of self-ligating orthodontic brackets, where a single bracket is adhered to each individual tooth in a subset of teeth with a bonding material or other adhesive. Once the brackets are in position on the teeth, an archwire is inserted into a slot formed on each of the brackets. In this configuration, the archwire applies pressure on the brackets, which in turn, urge movement of the teeth into a desired position and orientation.

In some designs, self-ligating brackets may include a ligating door or slide with a spring or other biasing element to help retain the archwire in position within the slot. In such designs, the ligating slide is movable between an open position and a closed position. In the open position, the ligating slide is partially retracted from the bracket body to provide access to the archwire slot and allow insertion of the archwire therein. In the closed position, the ligating slide moves over the archwire slot and retains the archwire in the slot for proper orthodontic treatment.

In some conventional practices, dentists may use an explorer tool or other instruments to pry or pull the ligating door open for accessing the archwire when adjustments in treatment are required. One issue with these conventional tools and processes is that self-ligating orthodontic brackets are prone to calculus buildup, meaning that the force required to open the ligating door may be large depending on the amount of buildup. In many instances, this force is transferred from the bracket body to the patient's tooth because the explorer tool or other instruments are not optimized for opening the ligating door, resulting in significant patient discomfort. In some situations, the dentist may opt to simply remove and replace the entire bracket rather than risk injuring the patient's soft oral tissue, should the instrument slip off of the bracket, or causing unnecessary discomfort.

Accordingly, the present inventors have identified a need for an orthodontic tool design to facilitate the opening of ligating doors for self-ligating brackets and minimize patient discomfort and avoid injury to the patient's soft tissue. The orthodontic tool is optimized to permit application of sufficient force for operation and minimizes the force transferred from the bracket body to the patient's tooth, thereby minimizing patient discomfort, improving the overall patient experience, and avoiding the expense to replace orthodontic brackets that may be in good working order. Additional aspects and advantages will be apparent from the following detailed description of example embodiments, which proceeds with reference to the accompanying drawings.

BRIEF DESCRIPTION OF THE DRAWINGS

FIG. 1 is a perspective view of an orthodontic bracket in accordance with one embodiment.

FIG. 2 is a perspective view of a standalone ligating door of the orthodontic bracket of FIG. 1.

FIGS. 3 and 4 are views of an orthodontic tool designed for use with the orthodontic bracket and the ligating door of FIGS. 1-2.

FIG. 5 is an enlarged view of an end portion of the orthodontic tool of FIG. 4 illustrating various tip features.

FIGS. 8 and 9 illustrate the orthodontic tool engaged against the ligating door and orthodontic bracket with the ligating door moved to an open position.

DETAILED DESCRIPTION OF EXAMPLE EMBODIMENTS

Figure 6:
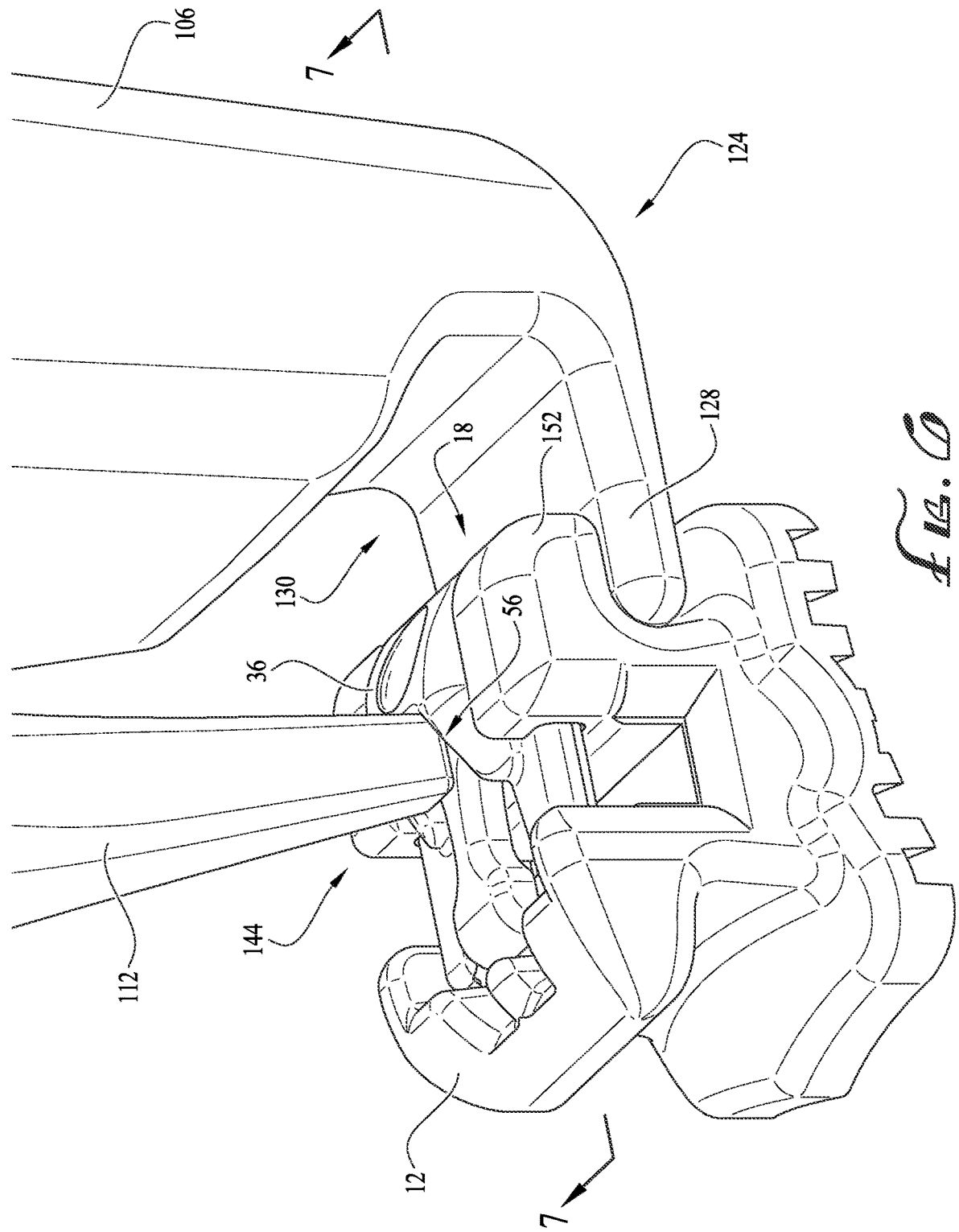
FIGS. 6 and 7 illustrate the orthodontic tool engaged against the ligating door and orthodontic bracket with the ligating door in a closed position.

With reference to the drawings, this section describes various embodiments of an orthodontic tool and its detailed construction and operation. Throughout the specification, reference to "one embodiment," "an embodiment," or "some embodiments" means that a described feature, structure, or characteristic may be included in at least one embodiment of the orthodontic tool. Thus, appearances of the phrases "in one embodiment," "in an embodiment," or "in some embodiments" in various places throughout this specification are not necessarily all referring to the same embodiment. Further, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like.

In the following description, certain components of an orthodontic bracket are described in detail, while others may not be. It should be understood that in some instances, well-known structures, materials, or operations are not shown or described in detail to avoid obscuring more pertinent aspects of the illustrated embodiments. In addition, although the embodiments may illustrate and reference a specific orthodontic bracket design, other embodiments may include additional or fewer components than the described embodiments without departing from the principles of the disclosed subject matter.

FIGS. 1-9 collectively illustrate embodiments of an orthodontic tool 100 designed for use to engage and facilitate opening of a ligating door 36. As is described in further detail below, the orthodontic tool 100 includes a tip 144 designed to sit against a recessed key slot 56 formed along the labial side of the ligating door 36. The tool 100 also includes another tip 124 with a projecting flange 128 designed to extend into a recessed slot 150 formed along an occlusal side 18 of the bracket body 12 of the orthodontic bracket 10. With the orthodontic tool 100 in position against the key slot 56 of the ligating door 36 and the recessed slot 150 of the bracket body 12, squeezing together the handles 104, 110 of the orthodontic tool 100 causes the tool tips 124, 144 to apply a reciprocal force on the ligating door 36 and the orthodontic bracket 10, which in turn urges movement of the ligating door 36 in the occlusal direction from a closed position to an open position. Additional details of these and other embodiments of the orthodontic bracket 10 and the orthodontic tool 100 are described further below with references to the figures.

FIG. 1 illustrates an example embodiment of an orthodontic self-ligating bracket 10 including a bracket body 12 with a ligating door 36 designed to move relative to the bracket body 12 between a closed position and an open position to facilitate orthodontic treatment. For purposes of establishing a frame of reference and general orientation, the following description (unless otherwise indicated) refers to the bracket 10 as being attached to a labial surface of a tooth on an upper jaw of the patient. For example, with reference to the bracket body 12 illustrated in FIG. 1, when the bracket body 12 is mounted to the tooth in the patient's upper jaw, the bracket body 12 has a lingual side 14 (bottom), a labial side 16 (top), an occlusal side 18 (rear), a gingival side 20 (front), a mesial side 22 (first side), and a distal side 24 (second side). Terms such as labial, lingual, mesial, distal, occlusal, and gingival used to describe the bracket 10 in this specification are relative to this frame of reference. It should be understood, however, that the embodiments of the disclosed subject matter are not limited to the chosen reference frame and descriptive terms, as the orthodontic bracket 10 may be used on other teeth and in other orientations within the oral cavity. For example, the bracket 10 may also be located on an anterior tooth in the lower jaw or maxilla and be within the scope of the disclosed subject matter. Those having ordinary skill in the art will recognize that the descriptive terms used herein may not directly apply when there is a change in the frame of reference. The disclosed subject matter is intended to be independent of location and orientation within the oral cavity and the relative terms used to describe the illustrated embodiments are to provide a clear description in conjunction with the drawings. As such, the relative terms labial, lingual, mesial, distal, occlusal, and gingival in no way limit the disclosed subject matter to a particular location or orientation but are instead offered to aid in understanding the disclosed subject matter.

With the frame of reference noted above and with general reference to FIG. 1, the bracket 10 includes a bracket body 12 mountable to a tooth via a base structure 26 formed on the lingual side 14 of the bracket body 12. The base structure 26 may include a series of grooves or ridges for receiving an adhesive or other bonding material to provide a solid connection with the tooth and prevent dislodging. The bracket body 12 further includes an archwire slot 28 extending across the bracket body 12 from a first side to a second side generally in a mesial-distal direction, such as from the mesial side 22 to a distal side 24. The archwire slot 28 includes a generally planar base surface 30 extending across the length of the slot 28 and opposing side walls 32, 34 extending upwardly in the labial direction from the base surface 30. In some embodiments, the side walls 32, 34 are perpendicular to the base surface 30 and form a generally rectilinear archwire slot 28 (e.g., a slot having a generally rectangular or square shape), the archwire slot 28 having open ends formed along the labial side 16, and along the mesial and distal sides 22, 24, respectively, of the bracket body 12.

With collective reference to FIGS. 1-2, the bracket body 12 further includes a ligating door 36 arranged on the labial side 16 of the bracket body 12 and designed for retaining an archwire (not shown) within the archwire slot 28. With particular reference to FIG. 2, the ligating door 36 includes a body 38 having a latching element 40. The latching element 40 includes a head 42 and an elongated flexible neck 44 extending from the body 40. The head 42 includes a protrusion 46 formed along a lingual side thereof, the protrusion 46 designed to engage with a seat (not shown) formed on the body 12 of the orthodontic bracket 10 to maintain the ligating door 36 in a closed position. In some embodiments, the door 36 may include a pair of ligation fingers 48, 50 extending from the body 38 and arranged on opposite sides of the latching element 40. The ligation fingers 48, 50 are received within a corresponding pair of guides 52, 54 formed along the labial side 16 of the bracket body 12 to securely retain the door 36 in position against the bracket body 12. Once the ligating door 36 is inserted into position within the bracket body 12, the ligation fingers 48, 50 and guides 52, 54 work together to restrict movement of the ligating door 36 along the mesial and distal sides 22, 24 and instead ensure the ligating door 36 moves primarily along the gingival-occlusal direction when the ligating door 36 is opened or closed. When the sliding door 36 is in the closed position, the archwire is urged downwardly into the archwire slot 28 to apply pressure to the bracket body 12 and the patient's teeth to produce the desired tooth movement. When an adjustment to orthodontic treatment is required, the sliding door 36 is moved to the open position to expose the archwire within the archwire slot 28 and provide access to the archwire for replacement.

One common challenge faced by practitioners relates to the difficulty in grasping the sliding door 36 properly to move it from the closed position to an open position. To facilitate this sliding action, the ligating door 36 includes an opening feature formed along its labial surface. With particular reference to FIG. 2, in one embodiment, the opening feature may be formed as a recessed key slot 56 adjacent the neck 44 of the latching element 40. The key slot 56 includes a base surface 58 that transitions into the neck 44 of the latching element 40 as illustrated in FIG. 2. The key slot 56 is further bounded by a first side wall 60, an opposite second side wall 62, and a third side wall 64 spanning between the first and second side walls 60, 62. In some embodiments, the walls 60, 62, 64 may be formed as part of a raised guide 66 on a labial side of the ligating door 36. With reference to FIGS. 3-9, additional details relating to the recessed key slot 56 and its functionality in relation to an orthodontic tool 100 for opening the ligating door 36 are described in further detail below.

With collective reference to FIGS. 3-5, the following provides additional details of the orthodontic tool 100 in accordance with one embodiment. With reference to FIG. 3, the orthodontic tool 100 includes a first portion 102 having a first handle 104 with a first jaw 106, and further includes a second portion 108 having a second handle 110 with a second jaw 112. Preferably, the first portion 102 and the second portion 108 are each formed as integral structures, where the respective first and second handles 104, 110 are formed along a first end and the respective first and second jaws 106, 112 are formed along an opposite second end as illustrated in FIG. 3. The tool 100 further includes a pin 114 (or other suitable mechanism) for pivotally coupling together the first portion 102 and the second portion 108 of the tool 100. In operation, squeezing together or moving apart the first and second handles 104, 110 controls the position of the first and second jaws 106, 112 relative to one another. For example, FIG. 3 illustrates the tool 100 in a closed position with the first and second jaws 106, 112 adjacent one another, and FIG. 4 illustrates the tool 100 in an open position with the first and second jaws 106, 112 spaced apart from one another.

FIG. 5 is an enlarged view of the first and second jaws 106, 112 illustrating additional features of these components. With reference to FIG. 5, the first jaw 106 includes an outer jaw surface 120 and an opposite inner jaw surface 122, the surfaces 120, 122 being generally tapered toward a first tip 124 formed on an end of the first jaw 106. The first tip 124 includes a rounded end surface 126 transitioning from the outer jaw surface 120 and a projecting flange 128 on a forward end thereof. The first tip 124 further includes a recessed pocket 130 formed between the projecting flange 128 and the inner jaw surface 122. As illustrated in FIG. 5, in one embodiment, the inner jaw surface 122 is recessed inwardly toward the outer jaw surface 120, forming the recessed pocket 130 bounded by an upper wall 132, a rear wall 134, and a bottom wall 136. The bottom wall 136 forms an upper portion of the flange 128, with the bottom wall 136 transitioning into a rounded leading edge surface 148 of the flange 128. As further described in detail below with reference to FIGS. 6-9, the walls 132, 134, 136 are formed with corresponding surface profiles designed to create a recessed pocket 130 having a suitable shape and dimension for receiving and accommodating the ligating door 36. For example, in some embodiments, the recessed pocket 130 may have a width dimension, W, measured from the leading edge surface 148 of the projecting flange 128 to the rear wall 134 that ranges between 0.07041 and 0.080". In other embodiments, the width dimension, W, may range between 0.074" and 0.078". In addition, the projecting flange 128 may have a height, H, measured from an exterior surface 138 of the projecting flange 128 to the bottom wall 136 that ranges between 0.010" and 0.020". In other embodiments, the height, W, may range between 0.015" and 0.018". It should be understood that in other embodiments, the particular dimensions of these components may differ depending on the relative dimensions of the bracket body and the ligating door.

The second jaw 112 includes an outer jaw surface 140 and an opposite inner jaw surface 142, the surfaces 140, 142 being generally tapered toward a second tip 144 formed on an end of the second jaw 112. The second tip 144 includes a generally rectangular end face 146 designed with a profile corresponding to that of the recessed key slot 56 on the labial side of the ligating door 36. With particular reference to FIG. 3, when the tool 100 is in the closed position, the inner jaw surface 122 of the first jaw 106 abuts the inner jaw surface 142 of the second jaw 112. As illustrated, the length of the second jaw 112 is shorter than a length of the first jaw 106 such that the second tip 144 of the second jaw 112 extends into a portion of the recessed pocket 130, with the end face 146 of the second tip 144 being spaced apart from the bottom wall 136 of the first jaw 106. In this configuration, the end face 146 of the second tip 144 is also spaced apart from the projecting flange 128 of the first tip 124. In some embodiments, the leading edge surface 148 of the projecting flange 128 extends beyond an outermost end point of the end face 146 where the end face 146 meets the outer jaw surface 140 as illustrated in FIG. 3.

Figure 7:
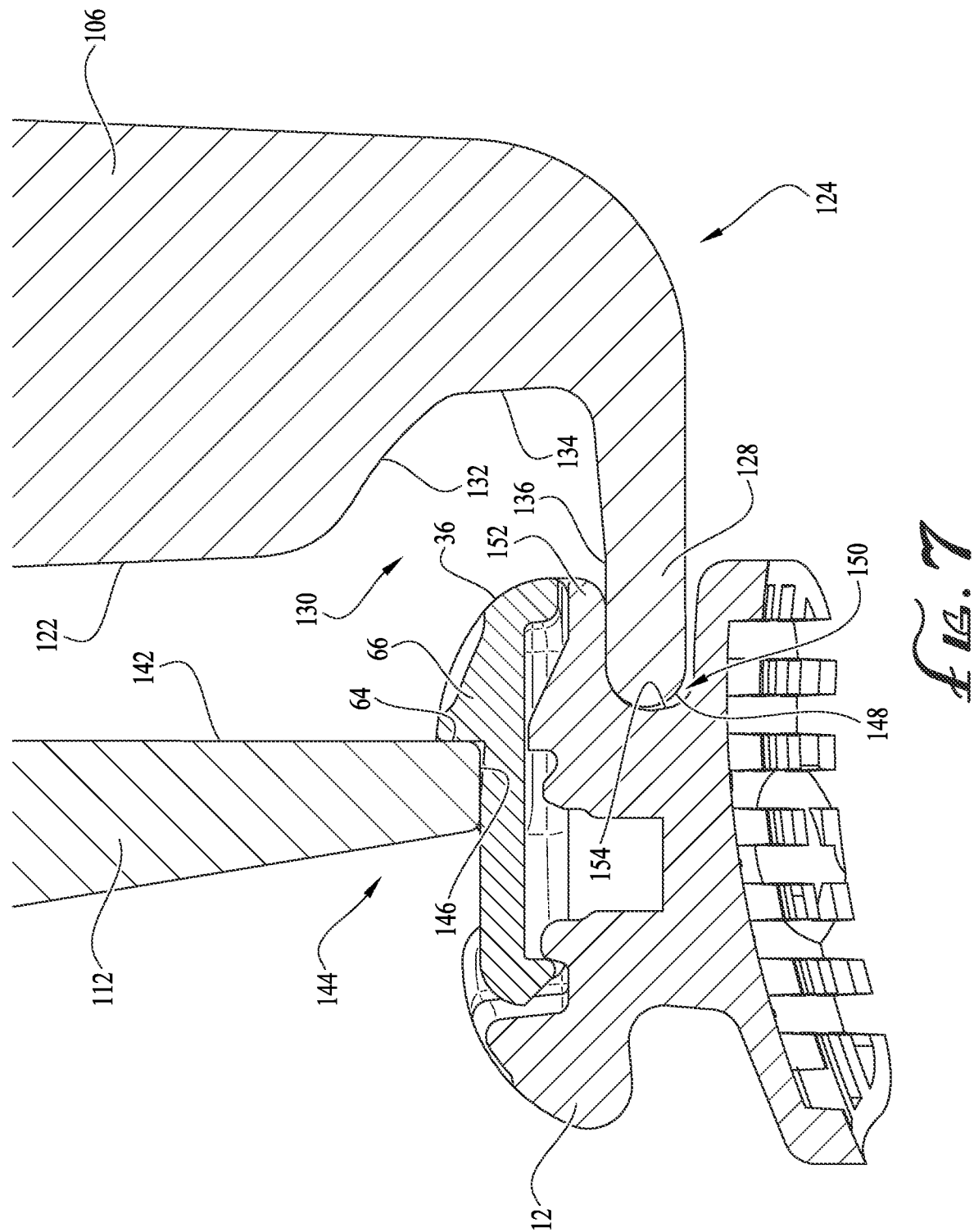

With reference to FIGS. 6-9, the following sections provide additional details for using the orthodontic tool 100 to operate the ligating door 36 in accordance with one embodiment. FIG. 6 illustrates the ligating door 36 in a closed position with the orthodontic tool 100 in position against the ligating door 36 and the bracket body 12. FIG. 7 is a cross-section view taken along section lines 7-7 of FIG. 6 to provide additional details. With collective reference to FIGS. 6 and 7, to open the ligating slide 36, the tool 100 is first positioned against the ligating slide 36 and the bracket body 12, with the first tip 124 of the first jaw 106 on the occlusal side 18 of the bracket body 12 and the second tip 144 of the second jaw 112 on the labial side of the ligating slide 36. With particular reference to FIG. 7, in this position, the second tip 144 of the second jaw 112 is seated within the recessed key slot 56 on the labial side of the ligating door 36, where the end face 146 of the second tip 144 sits against the base surface 58 of the key slot 56, and a lower portion of the inner jaw surface 142 of the second jaw 112 abuts against the third side wall 64 of the raised guide 66. In some embodiments, a portion of the end face 146 may be offset from a portion of the base surface 58 as illustrated in FIG. 7.

Turning to the first jaw 106, the projecting flange 128 of the first tip 124 is seated within a recess 150 formed underneath an occlusal tie wing 152 of the bracket body 12, with the tie wing 152 (and the ligating door 36) extending into the recessed pocket 130 of the first jaw 106 but spaced apart from the rear wall 134. In this configuration, the bottom wall 136 of the first jaw 106 abuts against a bottom surface of the tie wing 152, and the leading edge surface 148 of the projecting flange 128 abuts against an inner wall 154 of the bracket body 12. Preferably, the surface profile of the inner wall 154 is rounded in a similar fashion as the leading edge surface 148 of the projecting flange 128 for improved surface contact. In other embodiments, the corresponding surfaces of the leading edge surface 148 and the inner wall 154 may have suitable surface profiles other than being rounded, but it is preferable that the surface profiles correspond with one another to optimize performance of the orthodontic tool 100.

From the position of the tool 100 illustrated in FIGS. 6 and 7, when the first and second handles 102, 108 are squeezed together, the first and second jaws 106, 112 are moved toward one another and cause the tips 124, 144 to apply a reciprocal load against the ligating door 36 and the bracket body 12 to open the ligating door 36 along the occlusal direction. With collective reference to FIGS. 8 and 9, the inner jaw surface 142 of the second jaw 112 moves toward the inner jaw surface 122 of the first jaw 106, the inner jaw surface 142 applying a load against the rear wall 64, and the leading edge surface 148 of the projecting flange 128 applying a load against the inner wall 154. Together, this action drives the ligating door 36 along the occlusal direction and into the open position.

When the ligating door 36 is in the open position, the ligating door 36 extends into the recessed pocket 130 of the first tip 124. In some embodiments, a rear edge 156 of the ligating door 36 abuts against the rear wall 134 to ensure that the sliding door 36 is not inadvertently opened too far such that it may be decoupled from the bracket body 12. To return the ligating door 36 to the closed position, the orthodontic tool 100 is removed from the ligating door 36 and the ligating door 36 is then pushed along the gingival direction.

It should be understood that while the figures illustrate an example design for the particular features of the described orthodontic bracket, other configurations may be possible without departing from the principles of the disclosed subject matter. In addition, although the description above contains much specificity, these details should not be construed as limiting the scope of the disclosed subject matter, but as merely providing illustrations of some embodiments. It should be understood that subject matter disclosed in one portion herein can be combined with the subject matter of one or more of other portions herein as long as such combinations are not mutually exclusive or inoperable.

The terms and descriptions used above are set forth by way of illustration only and are not meant as limitations. It will be obvious to those having skill in the art that many changes may be made to the details of the above-described embodiments without departing from the underlying principles of the disclosed subject matter.

The invention claimed is:
1. An orthodontic bracket and tool system comprising:
an orthodontic bracket comprising:
a bracket body mountable to a tooth, the bracket body including an archwire slot extending from a first side of the bracket body to an opposite second side, the archwire slot dimensioned to receive an archwire therein, the bracket body further including a recess formed on an occlusal side thereof and a recess wall forming a boundary of the recess; and a ligating member mountable to the bracket body and movable between an open position and a closed position, wherein at least a portion of the ligating member extends over the archwire slot to retain the archwire within the archwire slot when the ligating member is in the closed position, the ligating member further including a key slot formed on a labial side thereof, the key slot including a bottom surface and a slot wall extending along a labial direction from the bottom surface;

an orthodontic tool comprising:
a first portion having a first handle with a first jaw, wherein the first jaw includes an inner jaw surface, an outer jaw surface, and a first tip formed along an end thereof, wherein the first tip includes a projecting flange and a pocket recessed inwardly from the inner jaw surface;

a second portion having a second handle with a second jaw, wherein the second jaw includes an inner jaw surface, an outer jaw surface, and a second tip formed on an end thereof, the second tip including an end face; and a pin pivotally connecting the first portion and the second portion for accommodating pivotal movement of the first and second portions, wherein the inner jaw surface of the first portion faces the inner jaw surface of the second portion, wherein when the orthodontic tool is coupled to the orthodontic bracket, the projecting flange of the first tip of the first jaw extends into the recess on the occlusal side of the bracket body and abuts the recess wall, and wherein the second tip of the second jaw abuts the slot wall of the key slot on the ligating member of the orthodontic bracket, and wherein when the first and second portions of the orthodontic tool are manipulated toward one another, the second tip of the second jaw applies a first force to drive the slot wall of the key slot along the occlusal direction and the projecting flange applies a second force to the recess wall of the bracket body, the second force reciprocal to the first force, to move the ligating member along the occlusal direction from the closed position to the open position.

2. The system of claim 1, wherein the first tip further includes a rear wall forming a boundary of the recessed pocket, and wherein the ligating member abuts the rear wall when the ligating member is in the open position.

3. The system of claim 2, further comprising an upper wall transitioning from the inner jaw surface along a first portion, the upper wall having a second portion transitioning into the rear wall, wherein the upper and rear walls together form a boundary of the recessed pocket.

4. The system of claim 3, further comprising a bottom wall including a first portion transitioning from the rear wall, wherein the upper, rear, and bottom walls together form the boundary of the recessed pocket.

5. The system of claim 4, wherein the bottom wall includes a second portion transitioning into a leading edge surface of the projecting flange, and wherein the leading edge surface contacts the recess wall of the bracket body when the first and second portions of the orthodontic tool are manipulated toward one another.

6. The system of claim 4, wherein the second tip is offset from each of the upper wall, rear wall, and bottom wall that together form the boundary of the recessed pocket.

7. The system of claim 1, wherein the projecting flange includes a leading edge surface on an end thereof, and wherein the leading edge surface contacts the recess wall of the bracket body when the first and second portions of the orthodontic tool are manipulated toward one another.

8. The system of claim 7, wherein the leading edge surface of the projecting flange and the recess wall of the bracket body each comprise corresponding rounded profiles.

9. The system of claim 1, wherein the key slot on the ligating member includes a first side wall and an opposite second side wall extending upwardly along the labial direction from the bottom surface, and wherein the slot wall extends between the first and second side walls, and wherein some or all of the first side wall, second side wall, and slot wall abut against the second tip of the second jaw when the orthodontic tool is coupled to the orthodontic bracket.

10. The system of claim 1, wherein the inner jaw surface and the outer jaw surface of the first jaw taper inwardly toward the first tip, and wherein the inner jaw surface and the outer jaw surface of the second jaw taper inwardly toward the second tip.

11. The system of claim 1, wherein the end face of the second tip sits against the bottom surface of the key slot when the orthodontic tool is coupled to the orthodontic bracket.

12. The system of claim 1, wherein when the orthodontic tool is in the closed position, the inner jaw surface of the first jaw abuts against the inner jaw surface of the second jaw, and the end face of the second tip is positioned within the pocket of the first tip and offset from the projecting flange.

13. The system of claim 12, wherein the projecting flange further includes a leading edge surface on an end thereof, and wherein the leading edge surface extends beyond an outermost end at which the end face of the second tip meets the outer jaw surface of the second jaw when the orthodontic tool is in the closed position.

14. An orthodontic tool for use in opening a ligating door of an orthodontic bracket, the orthodontic tool comprising:
a first portion having a first handle with a first jaw, wherein the first jaw includes an inner jaw surface and an outer jaw surface, the inner and outer jaw surfaces each tapering inwardly toward a first tip formed on an end of the first jaw, wherein the first tip includes a projecting flange and a pocket, the first jaw including a first wall transitioning from the inner jaw surface and extending inwardly from the inner jaw surface toward the outer jaw surface, the first wall forming a boundary of the pocket such that the pocket is at least partially recessed inwardly from the inner jaw surface;

a second portion having a second handle with a second jaw, wherein the second jaw includes a substantially planar inner jaw surface and a substantially planar outer jaw surface, the inner and outer jaw surfaces each tapering inwardly toward a second tip formed on an end of the second jaw, wherein the second tip includes an end face on an end thereof, the end face extending between the inner jaw surface and the outer jaw surface; and a pin pivotally connecting the first portion and the second portion for accommodating pivotal movement of the first and second portions, wherein when the orthodontic tool is in a closed position, the inner jaw surface of the first jaw abuts against the inner jaw surface of the second jaw, and the end face of the second tip is positioned within the pocket of the first tip, the end face offset from and facing the projecting flange.

15. The orthodontic tool of claim 14, wherein the first jaw further includes a second wall transitioning from the first wall, and a third wall transitioning from the second wall, and wherein the third wall forms a portion of the projecting flange, and wherein the second and third walls further form the boundary of the recessed pocket.

16. The orthodontic tool of claim 15, wherein the outer jaw surface of the first jaw is substantially planar and further includes a rounded end surface transitioning from the outer jaw surface to a bottom wall of the projecting flange, and wherein the third wall and the bottom wall of the projecting flange transition into a leading edge surface of the projecting flange.

17. The orthodontic tool of claim 15, wherein the second tip is offset from each of the first wall, the second wall, and the third wall that together form the boundary of the recessed pocket when the orthodontic tool is in the closed position.

18. The orthodontic tool of claim 17, wherein the third wall transitions into a rounded leading edge surface of the projecting flange, and wherein the end face of the second tip faces the third wall.

19. The orthodontic tool of claim 14, wherein the projecting flange further includes a leading edge surface on an end thereof, and wherein the leading edge surface extends beyond an outermost end at which the end face of the second tip meets the outer jaw surface of the second jaw when the orthodontic tool is in the closed position.

20. The orthodontic tool of claim 14, wherein the pocket is at least partially disposed between the inner jaw surface and the outer jaw surface.

\* \* \* \* \*